(12) United States Patent
Scantlin (10) Patent No.: US 8,474,480 B1
(45) Date of Patent: Jul. 2, 2013

(54) ACTUATOR CONTROL VALVE

(75) Inventor: Gary W. Scantlin, Oklahoma City, OK (US)

(73) Assignee: BS&B Safety Systems Limited, Limerick (IE)

( * ) Notice: Subject to any disclaimer, the term of this patent is extended or adjusted under 35 U.S.C. 154(b) by 415 days.

(21) Appl. No.: 12/793,111

(22) Filed: Jun. 3, 2010

(51) Int. Cl.
*F16K 31/363* (2006.01)
*F16K 17/40* (2006.01)
*G05D 7/01* (2006.01)

(52) U.S. Cl.
USPC ............. 137/488; 137/70; 137/102; 137/461; 137/463; 137/492.5

(58) Field of Classification Search
USPC ................ 137/68.11, 70, 102, 461, 463, 488, 137/492.5
See application file for complete search history.

(56) References Cited

U.S. PATENT DOCUMENTS

| | | | |
|---|---|---|---|
| 3,570,523 A * | 3/1971 | Pauliukonis | 137/102 |
| 3,747,627 A * | 7/1973 | Christie | 137/102 |
| 4,270,575 A | 6/1981 | Reed et al. | |
| 5,433,239 A * | 7/1995 | Taylor | 137/69 |
| 5,860,442 A * | 1/1999 | Taylor | 137/68.11 |
| 6,155,284 A | 12/2000 | Scantlin | |
| 6,325,088 B1 | 12/2001 | Scantlin | |
| 6,651,686 B2 | 11/2003 | Scantlin et al. | |
| 6,880,568 B1 * | 4/2005 | Taylor | 137/488 |
| 2003/0131884 A1 * | 7/2003 | Hope et al. | 137/102 |

* cited by examiner

*Primary Examiner* — John Rivell
(74) *Attorney, Agent, or Firm* — Gary Peterson

(57) ABSTRACT

A spool valve is formed from a spool having two adjacent lands of equal cross-sectional dimensions, and a third land having greater cross-sectional dimensions than the other two. The spool reciprocably moves through a bore formed in a housing, so as to open and close fluid communication between selected pairs of ports formed in the housing. The bore includes a first chamber which receives the third land of the spool and has no externally communicating port formed in its walls. The spool valve may be used as a control valve for the actuator of a system valve. As the spool valve begins to actuate, the third land becomes exposed to actuator pressure. The greater area of the third land serves to increase the force applied to the spool valve by the actuator pressure source, enhancing protection from unintended or malicious resetting of the spool.

14 Claims, 5 Drawing Sheets

ACTUATOR CONTROL VALVE

FIELD OF THE INVENTION

The present invention relates generally to valves, and more particularly to actuator control valves, and control systems for such valves.

SUMMARY OF THE INVENTION

The present invention comprises a valve formed from a housing having interior side walls that define a bore. The bore is characterized by a first chamber having no externally communicating fluid port formed in its side walls, and by one or more additional chambers axially offset from the first chamber. A plurality of fluid ports are formed in the side walls of the said one or more additional chambers of the bore. Each fluid port communicates with the housing exterior.

A spool is disposed in slidable engagement with the housing within the bore and is reciprocably movable therethrough. The spool comprises axially spaced adjacent first and second lands closely received within the bore outside the first chamber thereof. A third land is closely received within the first chamber of the bore in axially offset relationship to the first and second lands. The third land has cross-sectional dimensions greater than those of the first and second lands.

The invention further comprises a valve formed from a housing having a bore. A plurality of ports provide communication between the bore and the housing exterior. A spool is disposed in slidable engagement within the bore and is reciprocably movable through the bore so as to open and close fluid communication between selected ones of the plurality of ports. The spool features axially spaced adjacent first and second, and a third land disposed in axially contiguous relationship to the second land. The third land has cross-sectional dimensions greater than those of the first and second lands.

DETAILED DESCRIPTION

Figure 1:
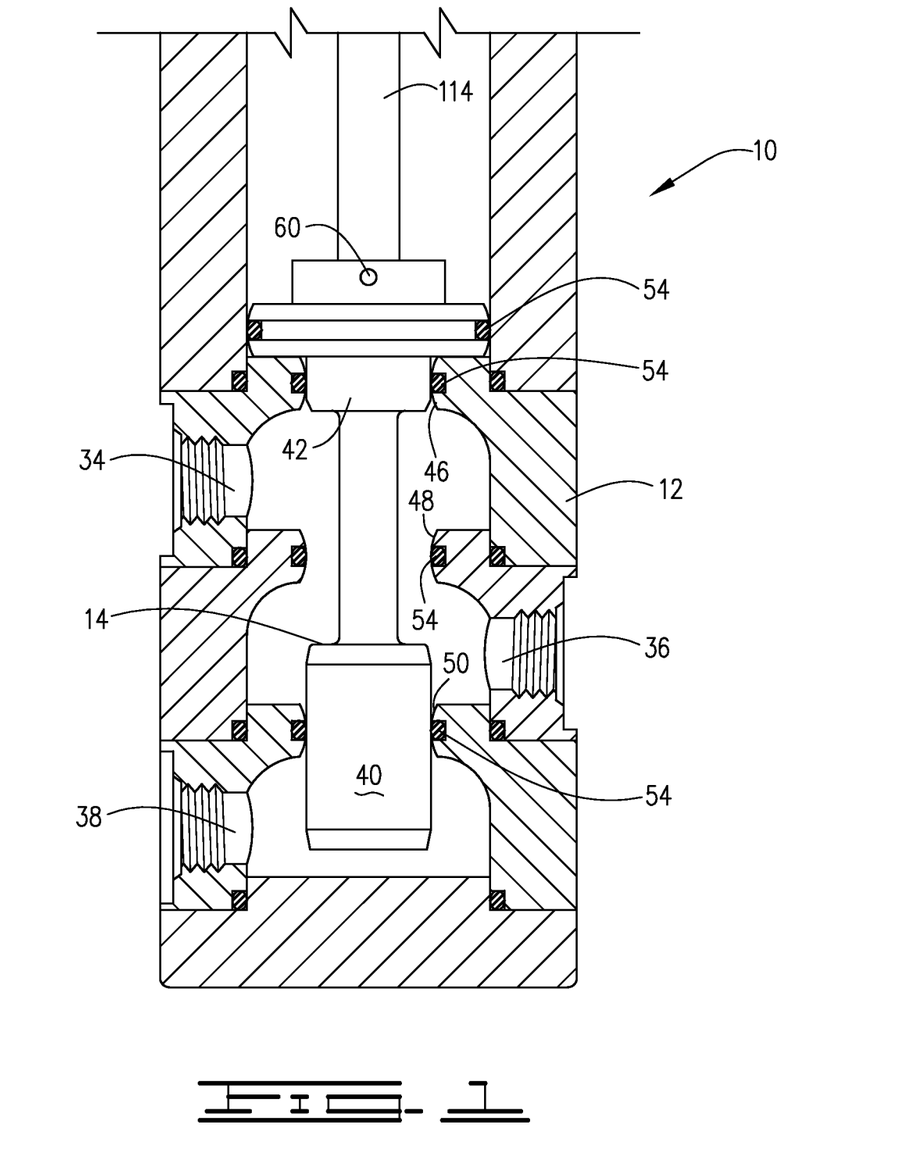
FIG. 1 is a front view of the valve of the present invention. The valve housing is shown in cross-section.
Figure 2:
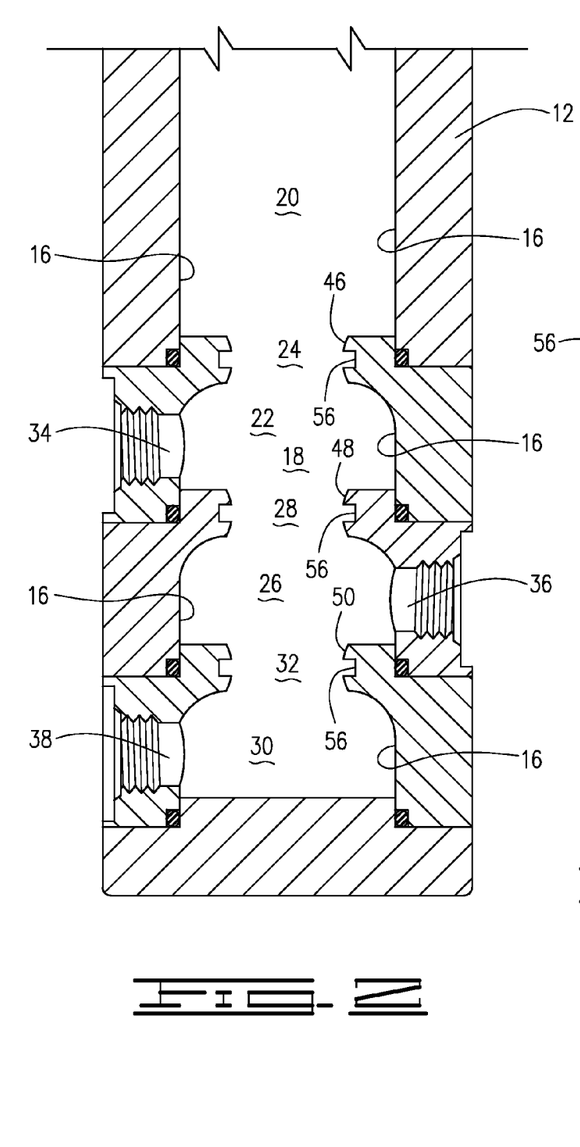
FIG. 2 is a cross-sectional view of the housing of the valve shown in FIG. 1.
Figure 3:
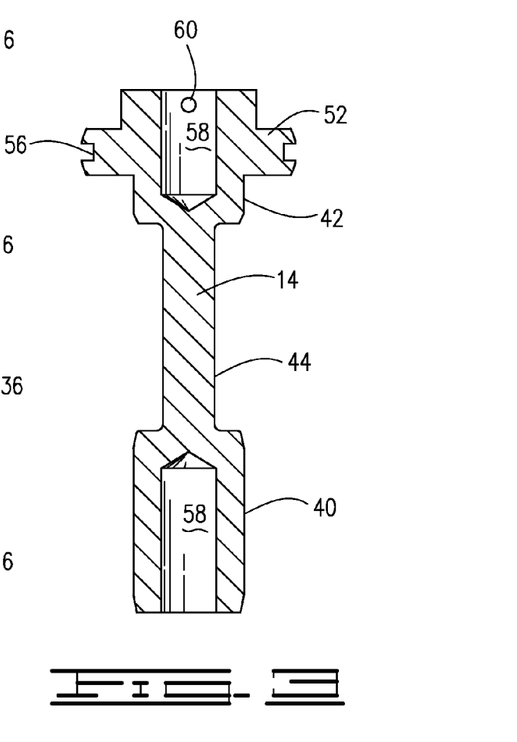
FIG. 3 is a cross-sectional view of the spool of the valve shown in FIG. 1.

With reference to FIGS. 1, 2 and 3, the present invention comprises a valve, generally designated by reference numeral 10, formed from a housing 12, shown in FIG. 2, and a spool 14, shown in FIG. 3.

With particular reference to FIG. 2, the housing 12 is characterized by interior side walls 16 defining a generally cylindrical bore 18. The bore 18 comprises an uppermost first chamber having no externally communicating fluid port formed in the side walls thereof, and one or more additional chambers axially offset from the first chamber. Preferably, the one or more additional chambers include a second chamber 22, linked to the first chamber 20 by a first passageway 24, a third chamber 26, linked to the second chamber 22 by a second passageway 28, and a fourth chamber 30, linked to the third chamber 26 by a third passageway 32.

A plurality of fluid ports are formed in the interior side walls of one or more of the said additional chambers of the bore 18, with each fluid port communicating with the exterior of the housing 12. Preferably, a first fluid port 34 is formed within the second chamber 22, a second fluid port 36 is formed within the third chamber 26, and a third fluid port 38 is formed within the fourth chamber 30.

As shown in FIG. 1, the spool 14 is disposed in slidable engagement with the housing 12 within the bore 18 and is reciprocably movable therethrough. As best shown in FIG. 3, the spool 14 comprises a first land 40 and an axially spaced second land 42, both preferably having a generally cylindrical shape. The first and second lands 40 and 42 should have cross-sectional dimensions and areas that are equal. The first and second lands 40 and 42 are separated by a groove 44. The first and second lands 40 and 42 are closely received within the bore 18 outside the first chamber 20.

Preferably, as shown in FIG. 2, the valve 10 comprises a first valve seat 46 surrounding the first passageway 24 and sized to closely receive the second land 42 of the spool 14. A second valve seat 48 surrounds the second passageway 28 and is sized to closely receive the first land 40 of the spool 14, while a third valve seat 50 surrounds the third passageway 32 and is also sized to closely receive the first land 40 of the spool 14.

With further reference to FIG. 3, the spool 14 further comprises a third land 52 closely received within the first chamber 20 of the bore 18, in axially offset relationship to the first and second lands 40 and 42. The third land 52, which is preferably of generally cylindrical shape, should be characterized by cross-sectional dimensions and area that are greater than the corresponding dimensions and areas of the first and second lands 40 and 42. In one embodiment, the cross-sectional radial dimension of the third land 52 is two times the corresponding cross-sectional radial dimensions of the first and second lands 40 and 42. In the embodiment shown in the Figures, the third land 52 is contiguous with the second land 42.

The interior side walls 16 and the spool 14 are provided with seals 54, shown in FIG. 1, in order to maintain substantially fluid-tight separation between the adjacent chambers of the bore 18. As shown in FIGS. 2 and 3, appropriately sized annular grooves 56 are formed in the walls 16 and spool 14 in order to accommodate these seals 54. The spool 14 may be penetrated by one or more axial bores 58, shown in FIG. 3, in order to facilitate attachment of the spool 14 to other equipment. In the embodiment shown in the Figures, the spool 14 is penetrated at its upper bore 58 by a transverse opening 60 through which a pin may be received.

Figure 5:
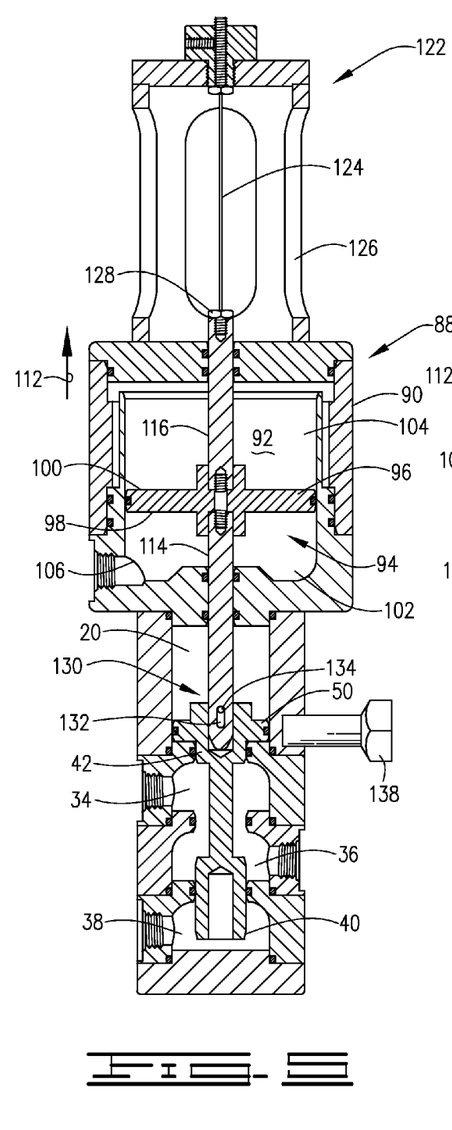
FIG. 5 is a front view showing the sensing assembly and the actuator control valve of the actuator system shown in FIG. 4, in normal operating condition. The sensing vessel, the biasing element and its cage are shown in cross-section.

The spool 14 is movable within the bore 18 between a first position, shown in FIGS. 1 and 5, in which the second land 42 is seated in the first valve seat 46 and the first land 40 is situated in the third valve seat 50, and a second position. In this second position, best shown in FIG. 8, the first land 40 is situated in the second valve seat 48, and the second and third lands 42 and 50 are situated within the first chamber 20.

As the spool 14 moves between its first and second positions, the lands open and close communication between different pairs of the fluid ports. In the first position of the spool 14 shown in FIGS. 1 and 5, the first and second fluid ports 34 and 36 may communicate by way of the bore 18, while communication with the third fluid port 38 is blocked by the first land 40, which is seated in the third valve seat 50. In the second position of the spool 14 shown in FIG. 8, the second and third fluid ports 36 and 38 may communicate by way of the bore 18, while communication with the first fluid port 34 is blocked by the first land 40, which is seated in the second valve seat 48.

Figure 4:
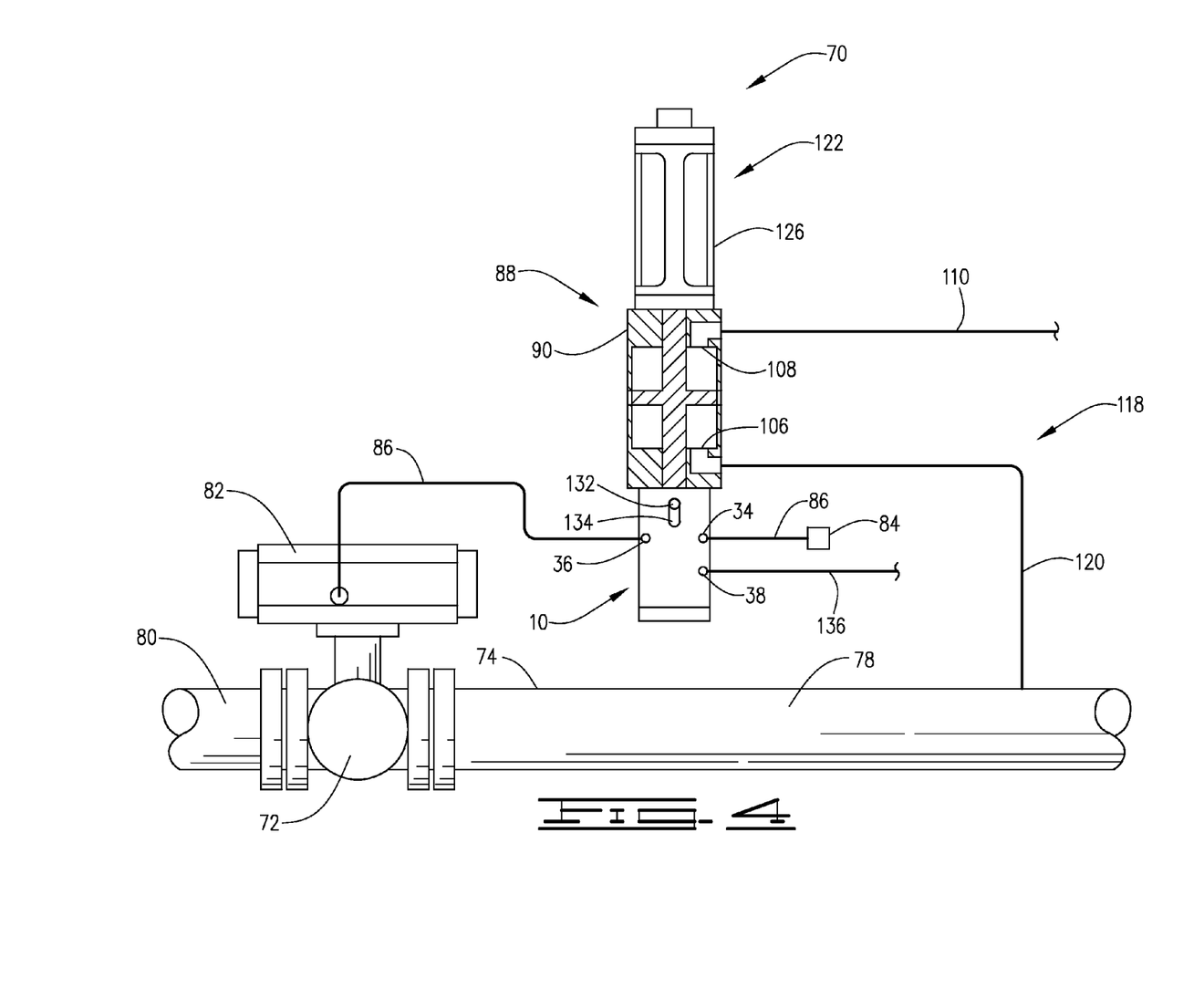
FIG. 4 is a semi-schematic view showing one embodiment of the actuator system of the present invention. The sensing vessel is shown in cross-section.

With reference to FIG. 4, the valve 10 of the present invention may be advantageously used as a component of an actuator system 70 for a system valve 72 which is exposable to a source of system pressure 74, such as a pipeline 76. In one embodiment, the system valve 72 comprises a rotationally actuated valve, such as a ball valve, butterfly valve, plug valve or other quarter turn valve. The system valve 72 is interposed within pipeline 76 between an upstream position 78 and a downstream position 80. The system pressure to which the system valve 72 is exposed in this embodiment is the pressure within the pipeline 76 at the upstream position 78.

The present invention further comprises an actuator 82 which is adapted for engagement with the system valve 72. The actuator 82 is characterized by an unactuated state and an actuated state, and is adapted to shift from its unactuated state to its actuated state in response to a predetermined change in pressure at the actuator 82. For example, the actuator 82 may include a motive element, such as a piston or other sliding element, which is movable within a housing, such as a cylinder, from an unactuated position, corresponding to the unactuated state. to an actuated position, corresponding to the actuated state.

An internal biasing element, such as a spring or pressure reservoir, may be included in the actuator 82 in order to apply a directional force to the motive element. If unopposed, the directional force applied by the biasing element is capable of moving the motive element from its unactuated position to its actuated position. This biasing force may be overcome by applying an offsetting pressure against the motive element, preferably provided by an actuator pressure source 84.

The actuator pressure source 84 preferably comprises a source of fluid pressure, such as pneumatic pressure or hydraulic pressure. This source may comprise instrument air, which is available in many industrial settings, or a self-contained hydraulic power source. The actuator 82 is interconnectable with an actuator pressure source 84 by an actuator fluid path 86, which may comprise a pipeline or other fluid conduit.

When the actuator 82 and the actuator pressure source 84 are interconnected by actuator fluid path 86, the pressure at the actuator 82 from the actuator pressure source 84 acts against the motive element of the actuator 82, and opposes and offsets the force applied by the biasing element to the motive element. As a result of this opposition, the motive element of the actuator 82 is maintained in its unactuated position.

In response to a predetermined change in pressure at the actuator 82, the motive element moves from its unactuated position to its actuated position. Such a predetermined change in pressure at the actuator may result from an interruption or obstruction in the actuator fluid path 86, or perhaps from a power failure which disables the actuator pressure source 84. After such a predetermined pressure change, the pressure opposing the biasing element is no longer sufficient to maintain the motive element in its unactuated position, and the motive element is moved to its actuated position.

The actuator 82 includes a coupling which interconnects the actuator 82 with the system valve 72. In response to transition of the actuator 82 from its unactuated state to its actuated state, this coupling causes the system valve 72 to shift from a first system valve position to a second system valve position. For example, the system valve 72 may be open in its first system valve position and closed in its second system valve position, or vice versa.

In many instances, the movement of the motive element of the actuator 82 will be a linear translational movement, whereas the system valve 72 is opened and closed by rotational movement of the stem. In this event, the coupling preferably comprises a crank or similar mechanism for converting the linear translational movement of the motive element to a rotary motion which can open, close or otherwise change the positioning of the system valve 72.

With reference to FIGS. 4 and 5-8, the system 70 of the present invention further comprises a sensing assembly 88 which monitors system pressure and mechanically responds to a designated system pressure. The sensing assembly 88 comprises an sensing vessel 90 having a longitudinal axis and opposed ends. The sensing vessel 90 is preferably cylindrical in shape, and is secured in a fixed position to a support surface by a bracket or other connector (not shown). In the embodiment shown in the Figures, the valve 10 provides the support surface for the sensing assembly 88.

The sensing vessel 90 is characterized by a tubular internal cavity 92 formed therein, also having a longitudinal axis and opposed ends. The internal cavity 92 is also preferably cylindrical in shape, and disposed in coaxial relationship with the sensing vessel 90. As best shown in FIGS. 5-8, the sensing assembly 88 further comprises a piston assembly 94. The piston assembly 94 comprises a piston 96, positioned within the internal cavity 92, and movable along the longitudinal axis of the internal cavity 92. The piston 96 is characterized by a first side 98 and an opposed second side 100.

The piston 96 divides the internal cavity 92 into a first region 102 and a second region 104, with the first region 102 adjacent the first side 98 of the piston 96, and the second region 104 adjacent the second side 100 of the piston 96. The internal cavity 92 and piston 96 are provided with seals in order to maintain substantially fluid-tight separation between the opposed first and second regions 102 and 104.

The first region 102 is characterized by a fifth fluid port 106 formed in the walls of the sensing vessel 88 and communicating with the exterior thereof. The second region 104 is similarly characterized by a sixth fluid port 108 (shown in FIG. 4), also formed in the walls of the sensing vessel 88 and communicating with the exterior thereof.

As the piston 96 moves along the longitudinal axis of the internal cavity 92, the volume of one of the regions 102 and 104 increases, and the volume of its opposed region decreases. Fluid within the contracting region can be exhausted from the sensing vessel 90 by way of its associated fluid port. In particular, as shown in FIG. 4, the sixth external port 108 is preferably connected to a regional exhaust fluid path 110, such as a pipeline or other fluid conduit. The regional exhaust fluid path 110 may be used to interconnect the contracting second region 104 with an exhaust muffler or speed control system (not shown).

The piston 96 is characterized by at least a first position and a second position, which is longitudinally offset in a second direction 112 from the first position. In the embodiment shown in FIGS. 4-8, the second direction 112 is upwards. The first position may correspond to the position of the piston 96 shown in FIGS. 4 and 5, although any other longitudinal position for the piston 96 can also be selected as the first position, as dictated by system geometry and requirements.

Figure 8:
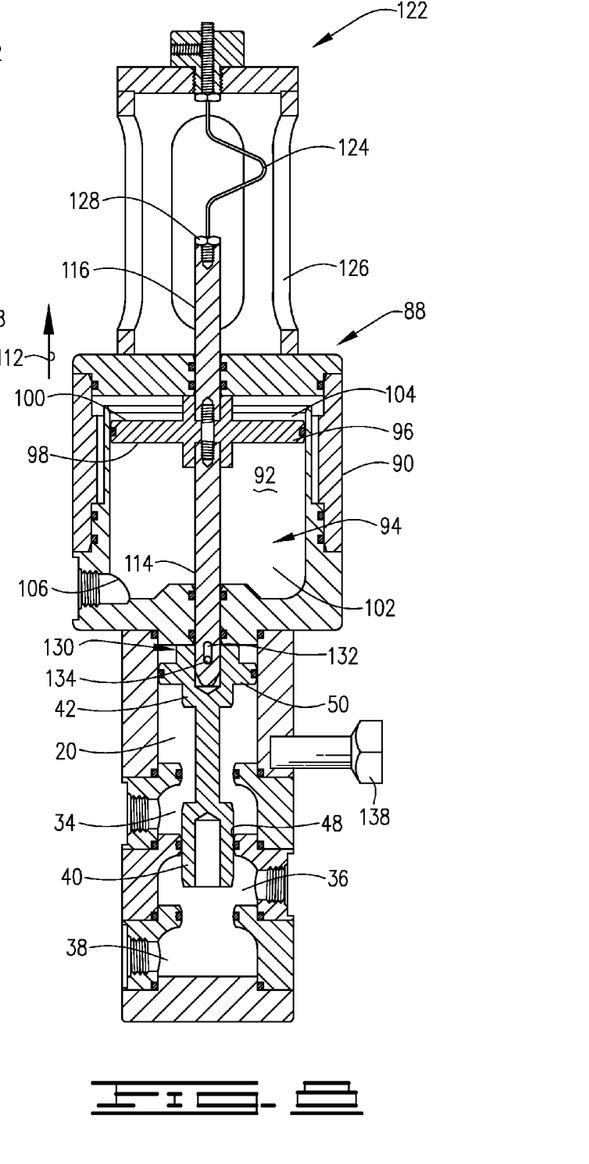
FIG. 8 is a front view showing the same sensing assembly and the actuator control valve as FIGS. 5, 6 and 7, as buckling of the biasing element become complete.

The longitudinally offset second position may correspond to the position of the piston 96 shown in FIG. 8, in which the volume of the second region 104 has been reduced, and the volume of the first region 102 has been expanded. Alternately, any other longitudinally offset position for the piston 96 can be selected as the second position, as dictated by system geometry and requirements.

The piston assembly 94 further comprises a first piston stem 114 engaged with the first side 98 of the piston 96 and extending longitudinally through the first region 102 and out the lower end of the sensing vessel 90. The piston assembly 94 preferably further comprises a second piston stem 116 engaged with the second side 100 of the piston 96 and extending longitudinally through the second region 104 and out the upper end of the sensing vessel 90. Seals maintain a substantially fluid-tight seal between the piston stems and the ends of the sensing vessel 88 through which they pass.

With reference to FIG. 4, the piston assembly 94 further comprises a piston control system 118 adapted to move the piston 96 from its first position to its second position in response to a designated system pressure. The piston control system 118 preferably comprises a sensing fluid path 120 interconnecting the source of system pressure 74 with the fifth fluid port 106 of the first region 102. The sensing fluid path 120 preferably comprises a pipeline or other fluid conduit interconnecting the fluid port 106 with the source of system pressure 74. This pipeline or conduit communicates with the fifth fluid port 106 formed in the sensing vessel 90.

With continued reference to FIGS. 4-9, the piston control system 118 preferably further comprises a biasing assembly 122, coupled to the piston 96 and disposed to oppose longitudinal movement of the piston 96 in the second direction 112. The biasing assembly 122 preferably comprises a biasing element 124, which is positioned within a housing, such as cage 126, which is in turn supported by the sensing vessel 90. The cage 126 is provided with a central axial opening through which the second piston stem 116 may clearingly extend. At its upper end 128, the second piston stem 116 engages the lower end of the biasing element 124, thereby coupling the piston 96 to the biasing element 124. In the embodiment shown in FIGS. 4-9, the biasing element 124 comprises a buckling pin.

Figure 6:
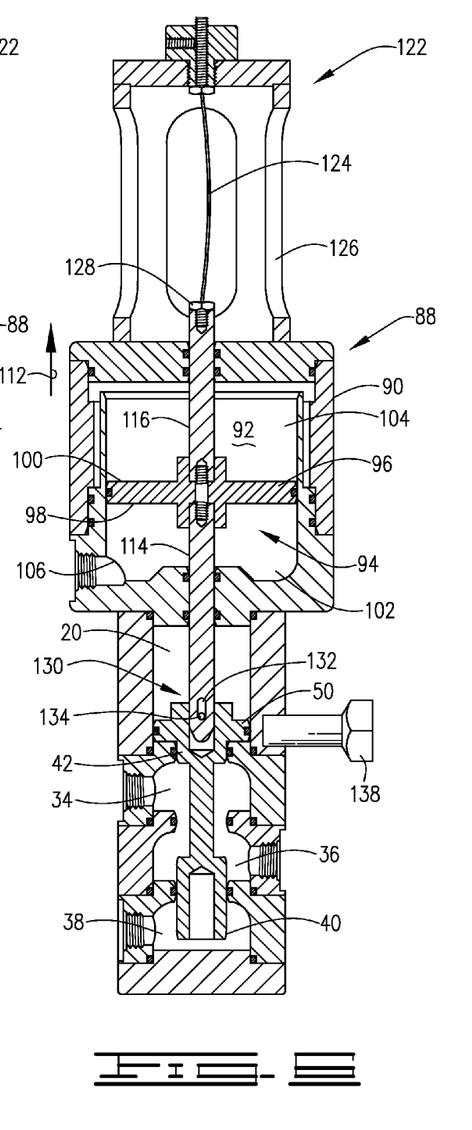
FIG. 6 is a front view showing the same sensing assembly and the actuator control valve as FIG. 5, as buckling pressure for the biasing element is approached.
Figure 7:
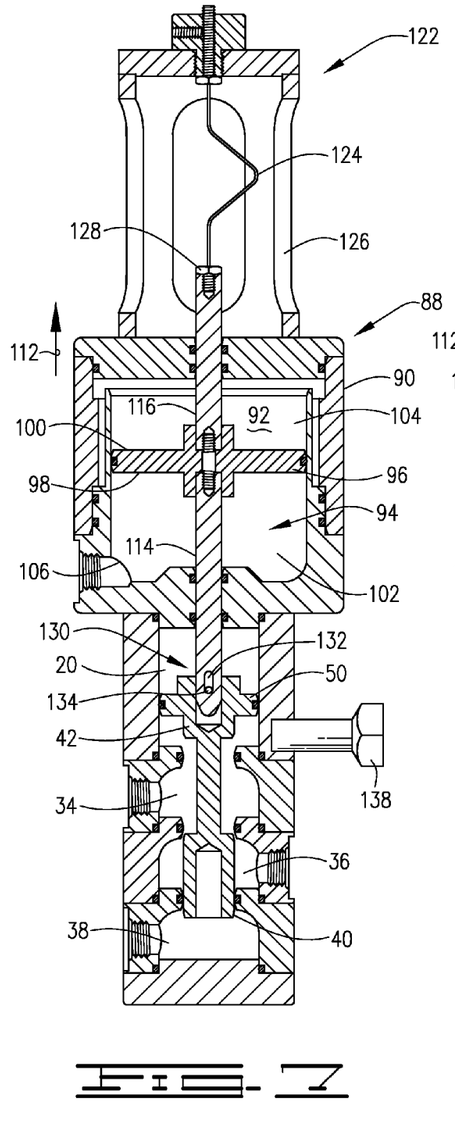
FIG. 7 is a front view showing the same sensing assembly and the actuator control valve as FIGS. 5 and 6, at the onset of buckling of the biasing element is

The characteristics of the biasing element 124 are selected so that the biasing element 124 undergoes a designated deformation, such as buckling, whenever subjected to a longitudinal force which equals the force generated by applying the designated system pressure against the piston 96 in the first region 102. Once such a designated system pressure has been established in the first region 102, a longitudinal force sufficient to cause the biasing element 124 to undergo the designated deformation is transmitted to the biasing element 124, and it accordingly undergoes this deformation, as shown in FIGS. 6-8.

As noted above, the system 70 of the present invention further comprises an actuator control valve 10, which is secured to a support surface (not shown) by a bracket or other connector (not shown), such that the position of the actuator control valve 10 remains fixed in relation to that of the sensing vessel 90. As shown in FIGS. 5-8, the actuator control valve 10 is mechanically coupled to the first piston stem 114, preferably by direct connection to the spool 14.

In one embodiment of the present invention, shown in FIGS. 4-8, the first piston stem 114, and thus the piston 96, are loosely coupled to the spool 14 of the actuator control valve 10. This loose coupling, generally designated by reference numeral 130, prevents relatively small movements of the piston 96, and thus first piston stem 114, from being transmitted to the spool 14 of the actuator control valve 10. Small changes in system pressure are routine in many systems, and will cause small movements of piston 96 and first piston stem 114. The loose coupling between the spool 14 and first piston stem 114 assures that such small movements will not lead to premature actuation of the system valve 72.

To form the coupling 138, the upper bore 52 of the spool 14 is sized to coaxially receive first piston stem 114 at its end opposite the piston 96. Adjacent this end, the first piston stem 114 is transversely penetrated by a slot-like passage 132. The passage 132 is aligned with the opening 60 in the spool 14, and a spring roll pin 134 installed therein. The pin 134 extends through the opening 60 and passage 130, and thereby connects the spool 14 to the first piston stem 114.

The coupling 130 permits the first end shaft 114 to move a distance equalling to the length of the slot-like passage 132 before such motion is transmitted to the spool 14, as illustrated in FIGS. 5 and 6. Any larger movement of the first piston stem 114 and piston 96 is transmitted to the spool 14 of the actuator control valve 10.

The coupling between the first piston stem 114 and the spool 14 must be configured so that movement of the piston 96 from its first position to its second position produces a corresponding movement of the spool 14 from its first position to its second position. Thus, in the first position of the piston 96, a fluid connection is established between the first and second fluid ports 34 and 36 of the actuator control valve 10. In the second position of the piston 96, a fluid connection is established between the second and third fluid ports 36 and 38 of the actuator control valve 10.

As shown in FIG. 4, the actuator control valve 10 is interposed in the actuator fluid path 86, with connections at the first and second fluid ports 34 and 36. Thus, when the actuator control valve 10 and the piston 96 are in their first positions, the actuator fluid path 86 is open, and permits communication between the actuator pressure source 84 and the actuator 82. On the other hand, when the actuator control valve 10 and the piston 96 are in their second positions, the actuator fluid path 86 is closed off in both directions at the actuator control valve 10.

The third fluid port 38 of the actuator control valve 10 is connected to an actuator fluid exhaust path 136, which may comprise a pipeline or other fluid conduit and which discharges to a fluid reservoir (not shown) or vents to the atmosphere. When the actuator fluid path 86 is blocked by shifting of the actuator control valve 10 to its second position, pressurized fluid at the actuator 82 will discharge, by way of the actuator control valve 10, into the actuator fluid exhaust path 136. This discharge results in a predetermined change in pressure at the actuator 82, normally comprising a drop in pressure. This predetermined change in pressure at the actuator 82 results from shift of the actuator control valve 10 to its second position, which in turn results from shift of the piston 96 to its second position.

In the normal state of the system 70, shown in FIGS. 1, 4 and 5, the actuator control valve 10 is in its first position, such that the first land 40 of the spool 14 engages the third valve seat 50 and is situated near the base of the actuator control valve 10, thereby maintaining the piston 96 in its first position. In its first position, the actuator control valve 10 permits fluid communication, by way of the actuator fluid path 86, between the actuator pressure source 84 and the actuator 82.

Actuator 82 is thereby maintained its unactuated state, and its associated system valve 72 accordingly remains in its first system valve position.

System pressure within the source of system pressure 74 is monitored at the piston 96 by way of the sensing fluid path 120. As discussed previously, because of the loose coupling between the first piston stem 114 and the spool 14, relatively small movements of the piston 96 do not cause actuation of the actuator control valve 10. However, with greater changes in system pressure, the force exerted within the first region 102 against the piston 96 eventually causes the second piston stem 116 to move in second direction 112 (upward in the Figures), thereby causing the biasing element 124 to deflect slightly, as shown in FIG. 6. Should system pressure subside at this point, the piston 96 and second piston stem 116 will move in the opposite direction, and the biasing element 124 will return to the undeflected condition shown in FIG. 5.

If system pressure should continue to increase beyond the level associated with FIG. 6, the force exerted within the first region 102 against the piston 96 causes it to move further toward its second position. The attached second piston stem 116 thus continues to move in second direction 112, thereby causing the biasing element 124 to fail and bend, as shown in FIG. 7.

Movement of the piston 96 to its second position is transmitted, by way of first piston stem 114, to the spool 14 of the actuator control valve 10, which is thereby caused to move from its first position toward its second position. As the first piston stem 114 moves in second direction 112, second land 42 is unseated from the first valve seat 46. When this occurs, the first chamber 24 opens to actuator pressure 84 via first passageway 24. This actuator pressure is applied against the now-exposed third land 52. The greater cross-sectional dimensions of the third land 52, as compared to the second land 42, increases the force being applied to the spool 14 by the source of actuator pressure 84, further pushing the spool 14 in second direction 112.

In FIG. 8, the biasing element 124 is fully bent, the piston 96 is at its second position, and the spool 14 is in its second position. The force applied against third land 52 by the actuator pressure source 84 maintains the piston 96 and spool 14 in their respective second positions.

When the actuator control valve 10 shifts from its first position to its second position, the actuator fluid path 86 is blocked by spool 14. As a result, pressurized fluid at the actuator 82 will discharge, by way of the actuator control valve 10, into the actuator fluid exhaust path 136. This discharge results in a predetermined change in pressure at the actuator 82, normally comprising a drop in pressure, thereby causing the actuator 82 to shift from its unactuated state to its actuated state. This transition of the actuator 82 in turn causes the system valve 72 to shift from its first system valve position to its second system valve position.

As shown in FIGS. 5-8, the valve 10 may be equipped with a proximity switch 138 that can signal a change in position of the spool 14. Such a signal can be used to confirm any change in state of the system valve 72.

In order to reset the system 70, both the source of system pressure 74 and the source of actuator pressure 84 must first be taken out of fluid communication with the system 70. The piston 96 and spool 14 may then be returned to their respective first positions, the biasing element 124 replaced and reset, and communication with the sources 74 and 84 reopened.

As long as the source of actuator pressure 84 continues to communicate with the system 70, the system 70 cannot be reset due to the actuator pressure being applied against the third land 50. This non-self-resetting feature protects against unintentional resetting of the valve 10 by environmental agents, such as gravity or wind, as well as against malicious resetting by unauthorized persons. Safe operating conditions in the source 74 can be accordingly be positively confirmed before the system 70 is returned to service.

The system 70 makes use of the system pressure 74, monitored by the sensing assembly 88, to control the actuator 82, and accordingly does not require electrical signals for control. Transient power outages, which may result from lightning strikes or electrical system surges, thus do not cause actuation of the system valve 72: actuation occurs only if and when the designated system pressure is reached with the source 74. The system 70 requires no outside power source (other than that required for the actuator 82), and can function as a self-contained system.

Changes may be made in the construction, operation and arrangement of the various parts, elements, steps and procedures described herein without departing from the spirit and scope of the invention as defined in the following claims.

The invention claimed is:

1. A valve comprising:
 a housing having interior side walls defining a bore, the bore comprising:
  a first chamber having no externally communicating fluid port formed in the side walls thereof; and
  one or more additional chambers axially offset from the first chamber;
 a plurality of fluid ports formed in the side walls of the said one or more additional chambers of the bore, each fluid port communicating with the housing exterior, the plurality of fluid ports including a first fluid port; and
 a spool disposed in slidable engagement with the housing within the bore and reciprocably movable therethrough, the spool comprising:
  axially spaced adjacent first and second lands closely received within the bore outside the first chamber thereof; and
  a third land closely received within the first chamber of the bore in axially offset relationship to the first and second lands, the third land having cross-sectional dimensions greater than the corresponding dimensions of the first and second lands;
 in which the one or more lower chambers comprise:
  a second chamber within which the first fluid port is formed; and
  a first passageway linking the first and second chambers;
 and in which the valve further comprises:
  a first valve seat surrounding the first passageway and sized to closely receive the second land of the spool.

2. The valve of claim 1 in which the plurality of fluid ports further includes a second fluid port and in which the one or more additional chambers further comprise:
 a third chamber in which the second fluid port is formed a second passageway linking the second and third chambers;
 and in which the valve further comprises:
  a second valve seat surrounding the second passageway and sized to closely receive the first land of the spool.

3. The valve of claim 2 in which the plurality of fluid ports further includes a third fluid port and in which the one or more additional chambers further comprise:
 a fourth chamber in which the third fluid port is formed; and
 a third passageway linking the third and fourth chambers;
 and in which the valve further comprises:
  a third valve seat surrounding the third passageway and sized to closely receive the first land of the spool.

4. The valve of claim 3 in which the spool is movable between a first position in which the second land is seated in the first valve seat and the first land is situated in the third valve seat, and a second position in which the first land is situated in the second valve seat.

5. The valve of claim 1 in which the second and third lands are contiguous.

6. A control system for an actuator of a system valve exposable to a source of system pressure comprising:
  a sensing assembly, comprising:
    a sensing vessel having an internal cavity;
    a piston assembly comprising:
      a piston positioned within the internal cavity, the piston having at least a first position and a second position, longitudinally offset from the first position in a second direction;
      a piston control system adapted to move the piston from its first position to its second position in response to a designated system pressure; and
  an actuator control valve comprising the valve of claim 1, the spool of the valve coupled to the piston.

7. The system of claim 6 in which the piston is loosely coupled to the spool of the actuator control valve.

8. The system of claim 6 in which the piston control system comprises:
  a biasing element, coupled to the piston and adapted to oppose longitudinal movement thereof.

9. The system of claim 8 in which the biasing element comprises a buckling pin.

10. A valve comprising:
  a housing having a bore, the bore comprising:
    a first chamber having no externally communicating fluid port formed in the side walls thereof; and
    one or more additional chambers axially offset from the first chamber;
  a plurality of ports situated in the said one or more additional chambers and providing communication between the bore and the housing exterior; and
  a spool disposed in slidable engagement within the bore and reciprocably movable through the bore so as to open and close fluid communication between selected ones of the plurality of ports, the spool comprising:
    axially spaced adjacent first and second lands separated by at least one groove; and
    a third land disposed in axially contiguous relationship to the second land, the third land having cross-sectional dimensions greater than the corresponding dimensions of the first and second lands;
  in which the third land is closely received within the first chamber of the bore, and in which the second land is fully receivable within the first chamber.

11. A control system for the actuator of a system valve exposable to a source of system pressure comprising:
  a sensing assembly, comprising:
    a sensing vessel having an internal cavity;
    a piston assembly comprising:
      a piston positioned within the internal cavity, the piston having at least a first position and a second position, longitudinally offset from the first position in a second direction;
      a piston control system adapted to move the piston from its first position to its second position in response to a designated system pressure; and
  an actuator control valve comprising the valve of claim 10, the spool of the valve coupled to the piston.

12. The system of claim 11 in which the piston is loosely coupled to the spool of the actuator control valve.

13. The system of claim 11 in which the piston control system comprises:
  a biasing element, coupled to the piston and adapted to oppose longitudinal movement of the piston.

14. The system of claim 13 in which the biasing element comprises a buckling pin.

* * * * *